(12) United States Patent
Kanagawa

(10) Patent No.: US 9,522,640 B2
(45) Date of Patent: Dec. 20, 2016

(54) WIRE HARNESS AND SHIELD CONDUCTIVE PATH

(71) Applicant: SUMITOMO WIRING SYSTEMS, LTD., Yokkaichi, Mie (JP)

(72) Inventor: Shuichi Kanagawa, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 14/829,075

(22) Filed: Aug. 18, 2015

(65) Prior Publication Data

US 2016/0059802 A1  Mar. 3, 2016

(30) Foreign Application Priority Data

Sep. 3, 2014  (JP) .................................. 2014-178671

(51) Int. Cl.
*B60R 16/02* (2006.01)

(52) U.S. Cl.
CPC ................... *B60R 16/0215* (2013.01)

(58) Field of Classification Search
USPC ....................................................... 174/72 A
See application file for complete search history.

(56) References Cited

U.S. PATENT DOCUMENTS 6,251,201 B1 * 6/2001 Allen ..................... H02G 1/08
156/47

FOREIGN PATENT DOCUMENTS

JP           2012-222888 A    11/2012

* cited by examiner

*Primary Examiner* — Dhirubhai R Patel
(74) *Attorney, Agent, or Firm* — Oliff PLC

(57) ABSTRACT

A wire harness includes a plurality of electrical lines to be collectively inserted into a pipe. Each of the electrical lines is a single-core line including a single-core conductor that is a single metal rod, and an insulating sheathing that envelops an outer circumference of the single-core conductor. Facing surfaces shaped so as to face each other across an approximately uniform gap in a facing direction when inserted into the pipe are formed on the plurality of electrical lines.

15 Claims, 7 Drawing Sheets

WIRE HARNESS AND SHIELD CONDUCTIVE PATH

BACKGROUND

This application claims priority to JP 2014-178671 filed in Japan on Sep. 3, 2014, the entire disclosure of which is hereby incorporated by reference in its entirety.

The present invention relates to a wire harness inserted into a pipe, and a shield conductive path obtained by a wire harness being inserted into a pipe with shield functionality.

Conventionally, in vehicles such as hybrid vehicles, there are cases in which a wire harness is routed under the bottom of the vehicle in order to connect devices installed in the back part of the vehicle, such as high-voltage batteries, to devices installed in the front part of the vehicle, such as inverters or fuse boxes. In this regard, a technique is known in which a wire harness is inserted into a metallic pipe to not only electromagnetically shield it, but also protect it from interference by foreign objects (e.g., see JP 2012-222888A).

SUMMARY

However, the electrical lines that make up the wire harness generally have a circular cross-sectional shape, and therefore even if the electrical lines are bundled and in contact with each other, large gaps form alongside each of the curved surfaces, excluding the positions of contact. In view of this, it is desirable to reduce the size of the gaps that are formed between the electrical lines (increase the space factor) as much as possible in order to reduce the diameter of the pipe.

The present invention has been realized in light of the above-described circumstances, and an object thereof is to provide a wire harness with which gaps that are formed between electrical lines when inserted into a pipe can be reduced.

A wire harness according to preferred embodiments includes: a plurality of electrical lines to be collectively inserted into a pipe, wherein each of the electrical lines is a single-core line including a single-core conductor that is a single metal rod, and an insulating sheathing that envelops an outer circumference of the single-core conductor, and facing surfaces shaped so as to be able to face each other via an approximately uniform gap when inserted into the pipe are formed on the plurality of electrical lines.

According to this wire harness, the electrical lines are arranged within the pipe via an approximately uniform gap, and therefore the gap that is formed between the electrical lines when inserted into the pipe can be reduced.

DETAILED DESCRIPTION OF EMBODIMENTS

The following describes preferable embodiments.

In a wire harness of the preferred embodiments, an outer circumferential surface shaped so as to be able to face an inner circumferential surface of the pipe via an approximately uniform gap when inserted into the pipe may be formed on each of the plurality of electrical lines. According to this configuration, the pipe and the electrical lines inserted into the pipe are arranged with an approximately uniform gap, and thus the diameter of the pipe can be further reduced.

Also, in the wire harness of the preferred embodiments, a flat fixing surface to which a stranded conductor made up of a plurality of twisted individual wires is to be fixed may be formed on an end portion of each of the single-core conductors, the flat fixing surfaces being formed to face in the same direction. According to this configuration, the stranded line conductors can be mounted on the flat fixing surfaces when performing the connection task, and therefore the stranded electrical lines can be easily connected to the end portions after the wire harness is inserted into the pipe.

Also in the wire harness of the preferred embodiments, the fixing surfaces may be arranged shifted in an axial direction. According to this configuration, the positions of the fixing surfaces, to which the stranded electrical line conductors are to be fixed, on the electrical lines are arranged shifted in the length direction, and therefore the task of connecting the stranded line conductors can be performed easily, compared to cases where the fixing surfaces are arranged lined up.

A shield conductive path of the preferred embodiments includes: the above wire harness; and a pipe having a shield function into which the wire harness is inserted, wherein junction portions between the single-core conductors and the stranded line conductors are collectively covered with a shield member.

First Embodiment

Below, a first embodiment will be described with reference to FIGS. 1 to 4.

Figure 1:
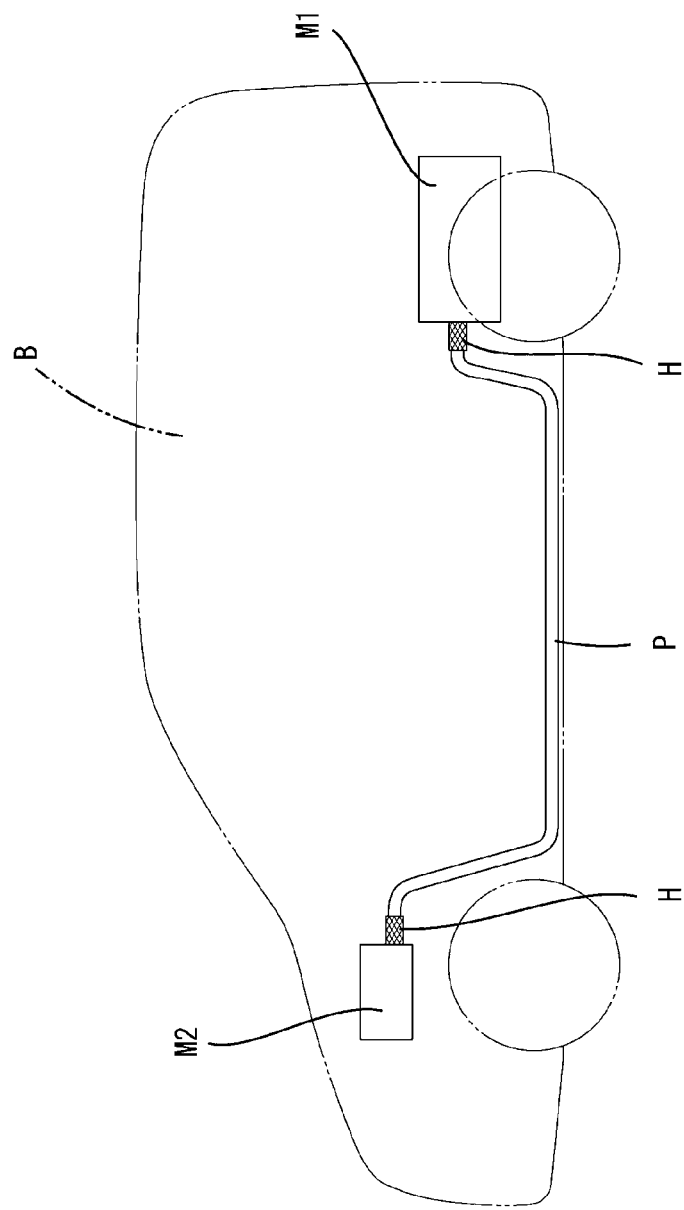
FIG. 1 is a schematic side view showing a routing path for a wire harness according to a first embodiment.

In a vehicle B such as a hybrid vehicle, a wire harness 10 of the present embodiment may be routed under the bottom of the vehicle B in order to connect a device M1 installed in the back part of the vehicle B, such as a high-voltage battery, to a device M2 installed in the front part of the vehicle B, such as an inverter or a fuse box (see FIG. 1). Note that each of the devices M1 and M2 is contained within a conductive shield case.

The wire harness 10 of the present embodiment may have multiple non-shielded electrical lines (two in the present embodiment) that are to be collectively inserted into a metallic pipe (pipe) P with a shield function.

Figure 4:
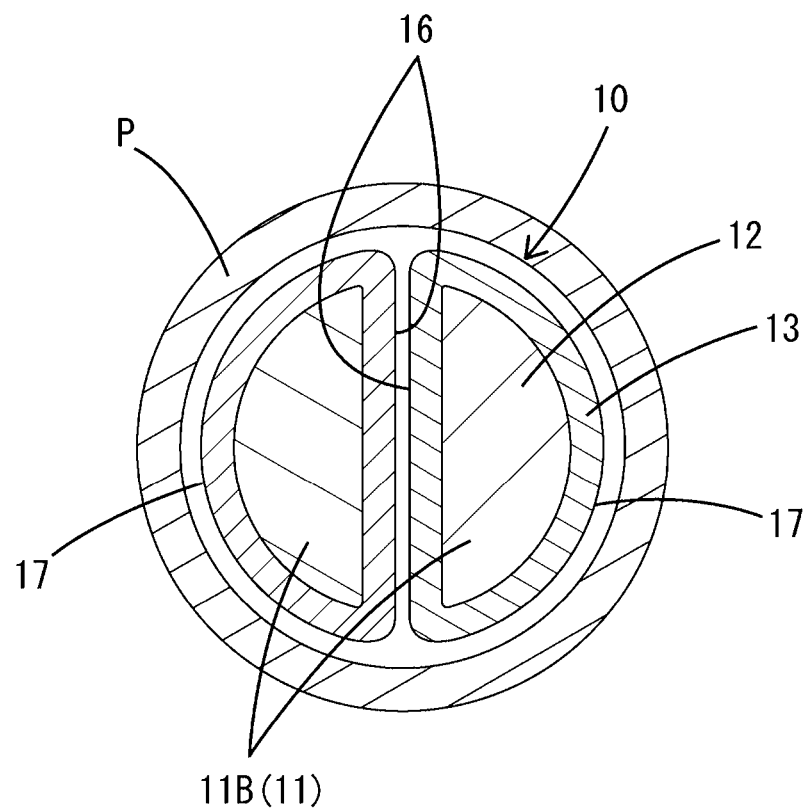
FIG. 4 is a cross-sectional view showing a cross-sectional shape of the wire harness.

The shield pipe P may be made of a metal (for example, steel, aluminum, copper, stainless steel, etc.), have, for instance, a tubular shape that can collectively envelope two electrical lines 11, and have a cross-sectional shape that is, for example, a perfect circle (see FIG. 4). The shield pipe P may be bent in a 3D direction into a bent shape that follows the routing path of the electrical lines 11. Note that the shield pipe P is not limited to a metallic shield pipe, and the shield pipe P may be, for example, an electronically conductive resin pipe.

Each electrical line 11 may be a single-core line that includes a single-core conductor 12, which may be made up of a single metal rod, and an insulating sheathing 13 that envelops the outer circumference of the single-core conductor 12. The single-core conductor 12 may be formed with, for example, copper or a copper alloy, or aluminum or an aluminum alloy, and has comparatively high rigidity and does not flex easily.

Figure 2:
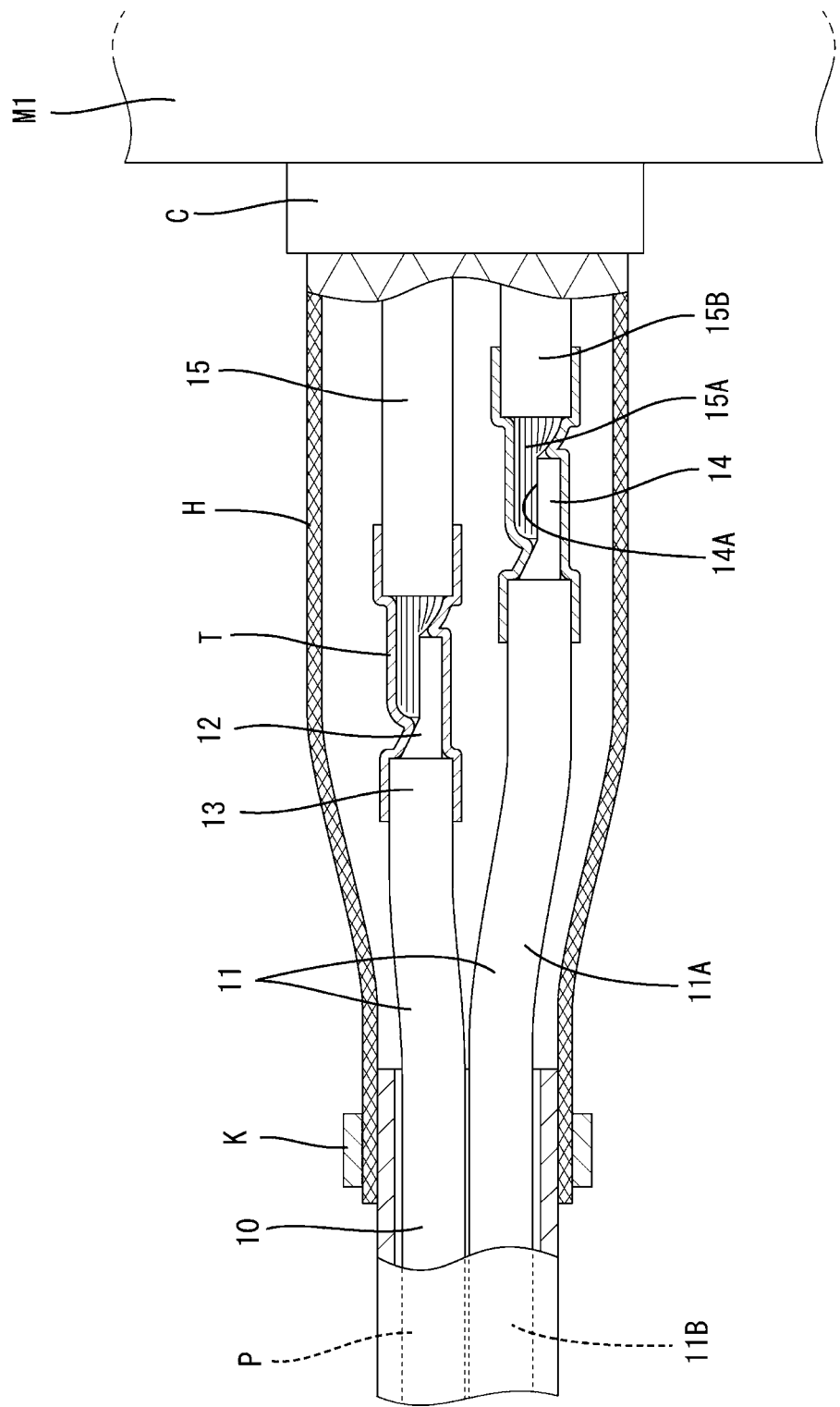
FIG. 2 is a side cross-sectional view showing an enlargement of a region including a junction portion between a single-core line and a stranded line.
Figure 3:
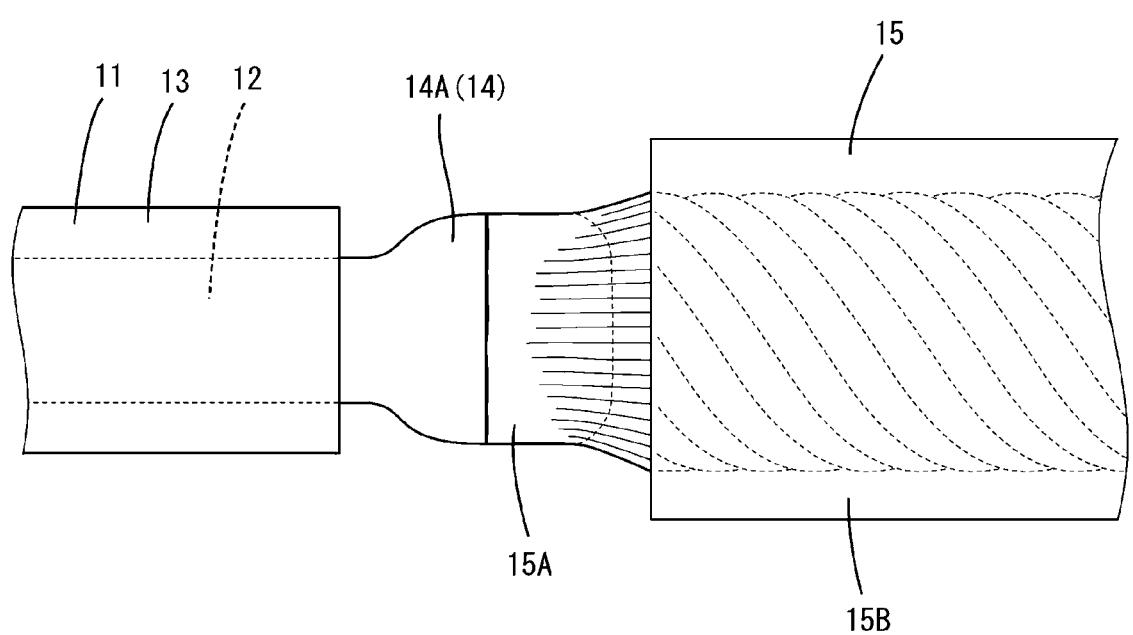
FIG. 3 is a plan view showing an enlargement of a junction portion between the single-core line and the stranded line.

As shown in FIG. 2, the two end portions of the electrical line 11 are drawn outside of the shield pipe P. Note that below, a pipe-external portion 11A refers to a portion of the electrical line 11 outside the shield pipe P, and a pipe-inserted portion 11B refers to a portion inserted into the shield pipe P.

The length dimensions of the pipe-external portions 11A of the electrical lines 11 may be different between the two electrical lines 11. As shown in FIG. 2, the insulating sheathing 13 is stripped from the end portions of the pipe-external portions 11A of each of the electrical lines 11 over a range having a predetermined length, and the single-core conductor 12 is exposed.

An exposed portion of the single-core conductor 12 may be collapsed from one side into a flat shape to form a collapsed portion 14 (see FIG. 2). A flat fixing surface 14A, to which the terminal portion of a stranded electrical line 15 is to be fixed, may be provided on the collapsed portion 14. The fixing surfaces 14A are formed so as to face in the same direction in the two electrical lines, and are arranged at positions shifted in the axial direction. Accordingly, the task of connecting the electrical line 11 and the stranded electrical line 15 can be performed easily. Also, because the positions of the junction portions for the electrical lines 11 and the stranded electrical lines 15 are shifted in the axial direction, the increase in the width dimension of the wire harness 10 in this portion can be prevented, compared to the case in which the positions of the junction portions are lined up side-by-side along the axial direction.

Each stranded wire 15 may be a non-shielded electrical line that includes a stranded conductor 15A that is made up of multiple individual wires twisted into a helix, and an insulating sheathing 15B that envelops the stranded conductor 15A. Each individual line may be formed, for example, with copper or a copper alloy, or with aluminum or an aluminum alloy. The stranded conductor 15A has low rigidity and easily flexes.

The insulating sheathing 15B is stripped from the two end portions of the stranded electrical line 15 over a range having a predetermined length, and the stranded conductor 15A is exposed (see FIG. 2). The end portion on one end side of the stranded electrical line 15 may be joined to the collapsed part 14 of the single-core conductor 12 by a method such as, for example, soldering or welding, and the end portion on the other side may be connected to a terminal metal filling that is not shown. Each of the terminal metal fillings may be housed in a connector C, and by mating either the device M1 or M2 to the connector C, an electrical connection can be made with the device M1 or M2 side.

The entire circumference of the junction portion between the electrical line 11 and stranded electrical line 15 may be covered by a heat shrinking tube T. The heat shrinking tube T is placed such that it spans between the insulating sheathing 13 of the electrical line 11 and the insulating sheathing 15B of the stranded wire 15. Accordingly, the junction portion between the electrical line 11 and stranded electrical line 15 is maintained in a sealed state and insulating state.

The pipe-external portion 11A of the electrical line 11 and the portion of the stranded electrical line 15 drawn out from the connector C may be collectively enveloped by a braided member H. The braided member H may be made with, for example, a thin metallic wire that has electric conductive properties, such as copper, and is weaved into a mesh, then formed into a tubular shape. Note that the enveloping may be performed with a metallic foil or a metallic foil with a slit instead of the braided member H.

One end side of the braided member H may be swaged to the outer circumferential surface of the shield pipe P with, for example, a metallic band K so as to be fixed and allow conduction, and the other end side may be fixed to the connector C so that conduction is possible.

Next, as shown in FIG. 4, facing surfaces 16 shaped so as to be able to face each other via an approximately uniform gap may be formed on the pipe-insertion portions 11B of the electrical lines 11. Each facing surface 16 is a flat surface with no irregularities, and the facing surfaces 16 are arranged so as to face each other and be approximately parallel to each other between the adjacent electrical lines 11. Also, an outer circumferential surface 17 shaped so as to be able to face the inner circumferential surface of the shield pipe P may be formed on each of the pipe insertion portions 11B. Each outer circumferential surface 17 may have, for example, a circular arc shape that follows the inner circumferential surface of the shield pipe P, and is arranged so as to be approximately parallel to the inner circumferential surface of the shield pipe P.

The cross-sectional shape of the pipe insertion portion 11B is, for example, roughly a semi-circle shape obtained by bisecting the inner space of the shield pipe P with a flat surface. The cross-sectional shape of the pipe insertion portion 11B forms the cross-sectional shape of the single-core conductor 12 into a semi-circular shape, and may be formed by enveloping the outer circumference of the single-core conductor 12 with the insulating sheathing 13 that has a constant thickness dimension.

The cross-sectional areas of the two electrical lines 11 (single-core conductors 12) are the same. The two electrical lines 11 are arranged within the shield pipe P such that the facing surfaces 16 face each other. As a whole, the two pipe insertion portions 11B arranged within the shield pipe P form a circular cross-sectional shape. The outer circumferential surface 17 of each of the electrical lines 11 (pipe insertion portions 11B) and the inner circumferential surface of the shield pipe P are separated by only the minimal required gap for insertion of the electrical lines 11.

Next is a description of an example of the task of inserting the wire harness 10 of the present embodiment into the shield pipe P and manufacturing the shield conductive path.

First, the wire harness 10 is inserted into the shield pipe P. The electrical lines 11, which have been cut to a predetermined length, are bundled such that the facing surfaces 16 face each other, and are then inserted into the shield pipe P. Then, the end portions of each of the electrical lines 11 are individually drawn out to a predetermined length and fixed. At this time, the task of inserting the electrical lines 11 can be performed comparatively easily, because the electrical lines do not flex easily, in contrast to stranded lines.

Next, the end portions of the electrical lines 11 are connected to the stranded lines 15. At this time, the connection task can be performed easily because the fixing surfaces 14A of the electrical wires 11 are facing the same direction, compared to a case in which, for example, the fixing surfaces of two electrical lines are facing opposite directions.

Following this, the shield pipe P is bent into a predetermined shape.

This completes the manufacturing task for the shield conductive path.

Next is a description of the actions and effects of the present embodiment as configured above.

The wire harness 10 in the present embodiment has a plurality of the electrical lines 11 collectively inserted into the shield pipe P, and the facing surfaces 16 shaped so as to be able to face each other via an approximately uniform gap when inserted into the shield pipe P are formed on the electrical lines 11. According to this configuration, the gap formed between the electrical lines 11 when inserted into the shield pipe P can be reduced because the electrical lines 11 are arranged within the shield pipe P via an approximately uniform gap.

Also, the outer circumferential surface 17 shaped so as to be able to face the inner circumferential surface of the shield pipe P via an approximately uniform gap when inserted into the shield pipe P is formed on each of the electrical wires 11. According to this configuration, the diameter of the shield pipe P can be further reduced because the electrical lines 11 are arranged with an approximately uniform gap from the shield pipe P when inserted into the shield pipe P.

Also, each electrical line 11 is a single-core line that includes a single conductor enveloped in the insulating sheathing 13. According to this configuration, the diameter of the shield pipe P can be further reduced because the circumference dimension of the electrical line 11 itself can be reduced, compared to the case in which, for example, the electrical lines are stranded lines, which is a core line made up of multiple twisted individual lines and covered in an insulating sheathing.

Note that because the shield pipe P of the present embodiment is routed under the bottom of the vehicle B, in consideration of the minimum ground clearance, it is desirable to minimize the diameter dimension of the shield pipe P, and the configuration of the present embodiment is particularly effective.

Second Embodiment

Figure 5:
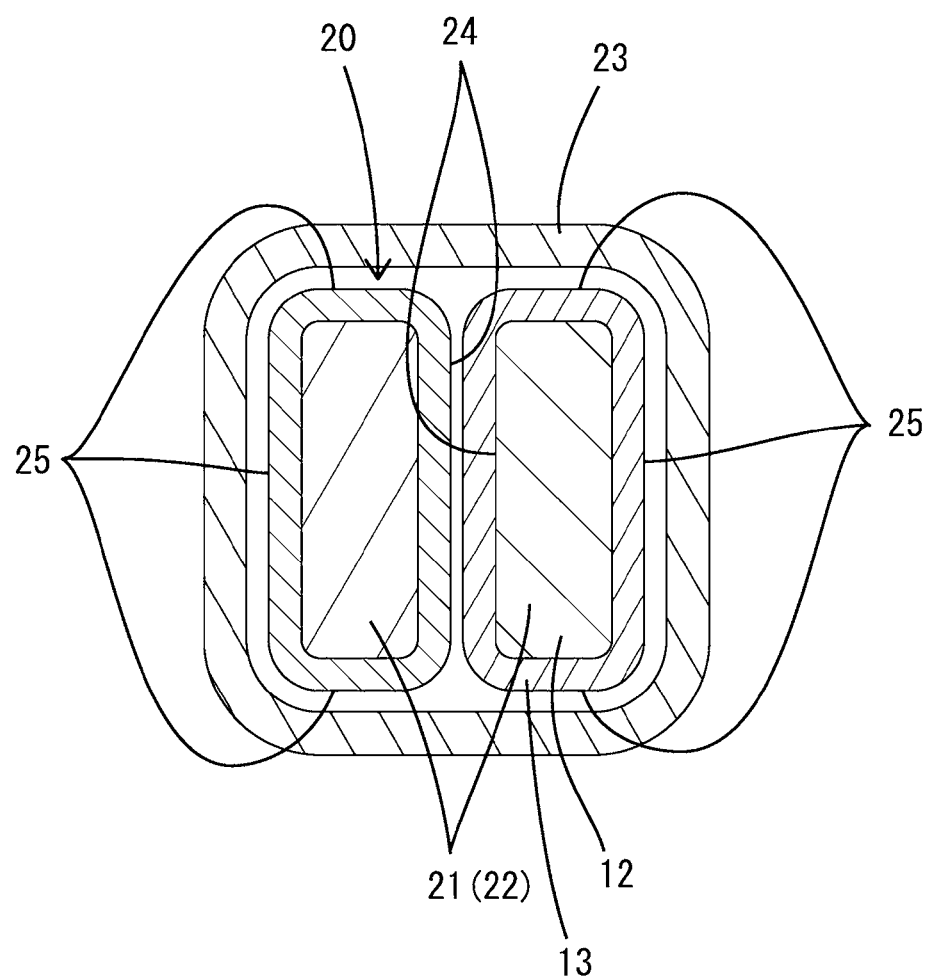
FIG. 5 is a cross-sectional view showing the cross-sectional shape of the wire harness according to a second embodiment.

Next, a wire harness 20 according to a second embodiment will be described with reference to FIG. 5.

A wire harness 20 in the present embodiment is different from the first embodiment in that the cross-sectional shape of pipe insertion portions 22 of electrical lines 21 is a rectangular shape, and the electrical lines 21 are inserted into a shield pipe 23 with a cross-sectional shape that is close to a square. Note that configurations similar to the first embodiment are indicated by the same reference numerals, and redundant description will be omitted.

Similarly to the first embodiment, the wire harness 20 of the present embodiment has two electrical lines 21 that are to be collectively inserted into the shield pipe 23, and the pipe insertion portions 22 of the electrical lines 21 are provided with facing surfaces 24 shaped so as to be able to face each other via an approximately uniform gap, and outer circumferential surfaces 25 shaped so as to be able to face the inner circumferential surface of the shield pipe 23 via an approximately uniform gap. Similarly to the first embodiment, only the minimum necessary gap for insertion of the electrical lines 21 has been formed between the outer circumferential surface 25 of each of the electrical lines 21 (pipe insertion portions 22) and the inner circumferential surface of the shield pipe 23.

Similarly to the first embodiment, the facing surfaces 24 are flat surfaces with no irregularities, and the two electrical lines 21 are arranged within the shield pipe 23 with the facing surfaces 24 facing each other. Note that similarly to the first embodiment, each electrical line 21 includes a single-core line that is made up of the single-core conductor 12, which is made up of a single metal rod, and the insulating sheathing 13 that envelops the single-core conductor 12.

The cross-sectional shape of the pipe insertion portion 22 is roughly a rectangular shape obtained by bisecting the inner space of the shield pipe P with a flat surface. Each of the pipe insertion portions 22 has three flat outer circumferential surfaces 25 that follow the internal circumferential surface of the shield pipe 23. The three outer circumferential surfaces 25 are approximately perpendicular to each other, and are each arranged to be approximately parallel with the inner circumferential surface of the shield pipe 23. The overall cross-sectional shape of the two pipe insertion portions 22 inserted into the shield pipe 23 is a square.

As described above, in the present embodiment, the pipe insertion portions 22 of the electrical lines 21 have facing surfaces 24 shaped so as to be able to face each other via an approximately uniform gap, and therefore, similarly to the first embodiment, the gap formed between the electrical lines 21 can be reduced.

Third Embodiment

Figure 6:
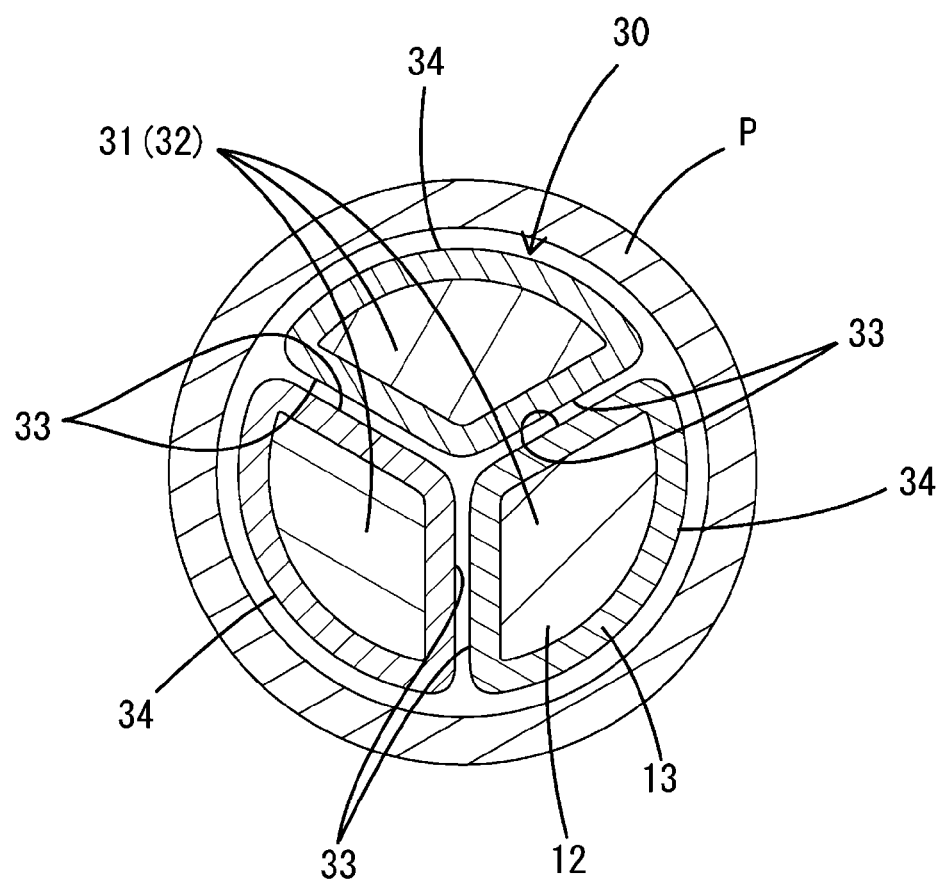
FIG. 6 is a cross-sectional view showing the cross-sectional shape of the wire harness according to a third embodiment.

Next, a wire harness 30 according to a third embodiment will be described with reference to FIG. 6.

The wire harness 30 in the present embodiment is different from the first embodiment in that the wire harness 30 has electrical lines 31 that are collectively inserted into the shield pipe P. Note that configurations similar to the first embodiment are indicated by the same reference numerals, and redundant description will be omitted.

Similarly to the first embodiment, in the wire harness 30 of the present embodiment, pipe insertion portions 32 of the electrical lines 31 have facing surfaces 33 shaped so as to be able to face each other via an approximately uniform gap, and outer circumferential surfaces 34 shaped so as to be able to face the inner circumferential surface of the shield pipe P via an approximately uniform gap. Similarly to the first embodiment, the outer circumferential surfaces 34 form a circular arc shape that follows the inner circumferential surface of the shield pipe P. A minimal necessary gap for insertion of the electrical lines 31 is formed between the outer circumferential surface 34 of each of the electrical lines 31 (pipe insertion portions 32) and the inner circumferential surface of the shield pipe P, similarly to the first embodiment. Note that similarly to the first embodiment, each electrical line 31 is a single-core line made up of the single-core conductor 12, which is made up of a single metal rod, and the insulating sheathing 13 that envelops the single-core conductor 12.

The cross-sectional shape of the pipe insertion portion 32 of each of the electrical lines 31 is roughly a fan shape obtained by trisecting the inner space of the shield pipe P with flat surfaces that form a radiating shape from the center. Each of the pipe insertion portions 32 has two flat facing surfaces 33, and the two facing surfaces 33 form a roughly 120-degree angle. The pipe insertion portions 32 of the three electrical lines 31 are lined up so that the facing surfaces 33 are parallel with each other and face each other around the central axis of the shield pipe P, and the overall cross-sectional shape is a circle.

As described above, in the present embodiment, the pipe insertion portions 32 of the electrical lines 31 have facing surfaces 33 shaped so as to be able to face each other via an approximately uniform gap, and therefore, similarly to the first embodiment, the gap between the electrical lines 31 can be reduced.

Fourth Embodiment

Figure 7:
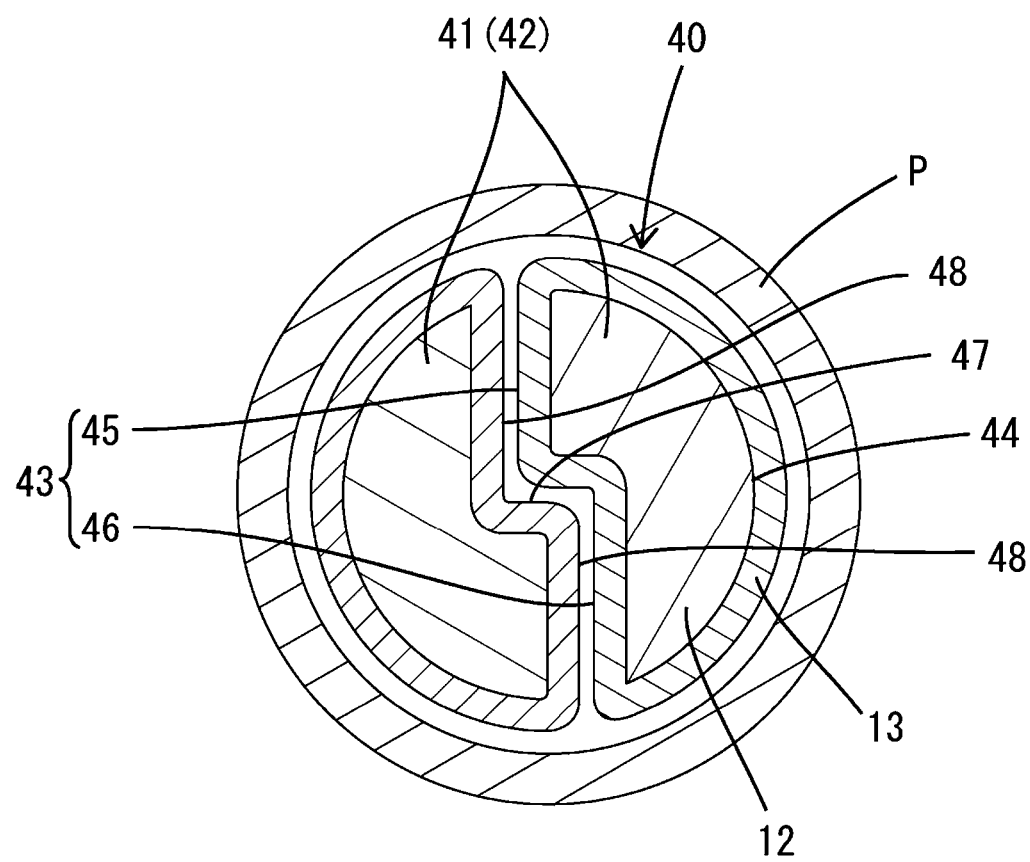
FIG. 7 is a cross-sectional view showing the cross-sectional shape of the wire harness according to a fourth embodiment.

Next, a wire harness 40 according to a fourth embodiment will be described with reference to FIG. 7.

The wire harness 40 in the present embodiment is different from the first embodiment in that a step is formed in a facing surface 43 of a pipe insertion portion 42 of each electrical line 41. Note that configurations similar to the first embodiment are indicated by the same reference numerals, and redundant description will be omitted.

Similarly to the first embodiment, the wire harness 40 of the present embodiment has two electrical lines 41 that are to be collectively inserted into the shield pipe P, and the pipe insertion portions 42 of the electrical lines 41 are provided with facing surfaces 43 shaped so as to be able to face each other via an approximately uniform gap, and outer circumferential surfaces 44 shaped so as to be able to face the inner circumferential surface of the shield pipe P via an approximately uniform gap.

Each facing surface 43 is provided with a protrusion and a depression in the facing direction facing the adjacent electrical line 41, that is to say approximately half of the facing surface 43 is a facing protrusion portion 45 that protrudes in the facing direction, and approximately half is a facing depression portion 46 that relatively recedes in the facing direction.

The facing surface 43 is constituted by three flat surfaces, one of these surfaces being a parallel surface 47 that is approximately parallel with the facing direction facing the adjacent electrical line 41, and the other two surfaces being perpendicular surfaces 48 that are approximately perpendicular to the parallel surface 47. The parallel surface 47 is positioned at approximately the center of the facing surface 43, and the perpendicular surfaces 48 are joined with the two outer sides of the facing surface 43. Note that the parallel surface 47 does not need to be positioned at the center of the facing surface 43.

Then, the two electrical lines 41 are arranged in the shield pipe P so that the facing surfaces 43 face each other, similarly to the first embodiment. At this time, the facing depression portion 46 of the facing surface 43 of one of the electrical lines 41 faces the facing protrusion portion 45 of the facing surface 43 of the other electrical line 41.

As described above, in the present embodiment, the pipe insertion portions 42 of the electrical lines 41 have facing surfaces 43 shaped so as to be able to face each other via an approximately uniform gap, and therefore, similarly to the first embodiment, the gap between the electrical lines 41 can be reduced.

Other Embodiments

The present invention is not limited to the embodiments described using the above descriptions and diagrams, and embodiments such as the following also fall under the technical scope of the present invention.

1) In the above embodiments, the pipe insertion portions 11B (22) (32) (42) of all of the electrical lines 11 (21) (31) (41) that constitute the wire harness 10 (20) (30) (40) have the same cross-sectional shape, but there is no limitation to this, and the pipe insertion portions may have different cross-sectional shapes or cross-sectional areas.

2) In the above embodiments, examples being applied to the wire harness 10 (20) (30) (40) having two or three electrical lines 11 (21) (31) (41) were described, but there is no limitation to this, and the disclosed features can also be applied to a wire harness that has four or more electrical lines.

3) In the above embodiments, cases were described in which the wire harness 10 (20) (30) (40) is inserted into the shield pipe P (23) having a shield function, but there is no limitation to this, and the disclosed features can also be applied to a wire harness that is inserted into a pipe that only has a protective function and does not have a shield function, such as a resin pipe.

4) In the above embodiments, the facing surfaces 16 (24) (33) (43) of the pipe insertion portions 11B (22) (32) (42) are constituted by flat surfaces, but there is no limitation to this, and the facing surfaces may be constituted by gently curved surfaces.

(5) In the above embodiments, cases were described in which the cross-sectional shape of the shield pipe P (23) is a perfect circle or square, but the external shape of the shield pipe may be any shape, such as an elliptical shape. Also, in the case where the shield pipe has a horizontally long cross-section, the pipe insertion portions of the electrical lines may be lined up in the lengthwise direction of the cross-section.

(6) In the above embodiments, the outer circumferential surfaces 17 (25) (34) (44) arranged to be parallel with the inner circumferential surface of the shield pipe P (23) are formed on the pipe insertion portions 11B (22) (32) (42) of the electrical lines 11 (21) (31) (41), but these outer circumferential surfaces are not necessarily required to be formed, and, for example, the wire harness described in the first embodiment that has a circular cross-sectional shape when the pipe insertion portions of the two electrical lines are bundled may be inserted into a rectangular shaped shield pipe as described in the second embodiment.

What is claimed is:

1. A wire harness comprising:
   a plurality of electrical lines to be collectively inserted into a pipe,
   wherein each of the electrical lines is a single-core line including a single-core conductor that is a single metal rod, and an insulating sheathing that envelops an outer circumference of the single-core conductor,
   a pipe-inserted portion of each electrical line is inserted into the pipe, and
   the pipe-inserted portion of each of said plurality of electrical lines has a facing surface shaped so as to face each other across an approximately uniform gap in a facing direction when inserted into the pipe, each of the facing surfaces being flat with no irregularities.

2. The wire harness according to claim 1, wherein
   an outer circumferential surface shaped so as to face an inner circumferential surface of the pipe across an approximately uniform gap when inserted into the pipe is formed on each of the plurality of electrical lines.

3. The wire harness according to claim 2, wherein
   the outer circumferential surface of each electrical line matches the inner circumferential surface of the pipe in shape.

4. The wire harness according to claim 1, wherein
   a flat fixing surface to which a stranded conductor made up of a plurality of twisted individual wires is to be fixed is formed on an end portion of each of the single-core conductors, each flat fixing surface being formed to face in the same direction.

5. The wire harness according to claim 4, wherein each flat fixing surface is arranged shifted relative to each other flat fixing surface in an axial direction of the wire harness.

6. A shield conductive path comprising:
the wire harness according to claim 4; and
the pipe, wherein the pipe has a shield function into which the wire harness is inserted, and
wherein junction portions between the single-core conductors and the stranded line conductors are collectively covered with a shield member.

7. The shield conductive path according to claim 6, wherein
each of the electrical lines has a pipe-external portion disposed outside the pipe and the pipe-inserted portion disposed inside the pipe, and
the flat fixing surface is formed on the pipe-external portion and not on the pipe-inserted portion.

8. The shield conductive path according to claim 6, wherein
each of the electrical lines has a pipe-external portion disposed outside the pipe and the pipe-inserted portion disposed inside the pipe, and
the flat fixing surface is formed on only a portion of the pipe-external portion.

9. The shield conductive path according to claim 6, wherein
each of the electrical lines has a pipe-external portion disposed outside the pipe and the pipe-inserted portion disposed inside the pipe, and
the shield conductive path further comprises a tube member disposed inside the shield member to cover the flat fixing surface and a portion of the pipe-external portion which does not have the flat fixing surface.

10. The shield conductive path according to claim 6, wherein
each of the electrical lines has a pipe-external portion disposed outside the pipe and the pipe-inserted portion disposed inside the pipe, the pipe-external portion of a first of the electrical lines being shorter than the pipe-external portion of a second of the electrical lines.

11. The wire harness according to claim 1, wherein
the facing surfaces of the electrical lines extend approximately parallel to each other.

12. The wire harness according to claim 1, wherein
the facing surface of each electrical line spans a diameter of the electrical line.

13. The wire harness according to claim 1, wherein
a first of the electrical lines has first and second facing surfaces, the first facing surface being arranged to face a facing surface of a second of the electrical lines, and the second facing surface being arranged to face a facing surface of a third of the electrical lines.

14. The wire harness according to claim 1, wherein
a first of the electrical lines has first, second, and third facing surfaces, the first and third facing surfaces extending parallel but on distinct planes.

15. The wire harness according to claim 1, wherein
a first of the electrical lines has first, second, and third facing surfaces, the first and third facing surfaces being spaced from each other in the facing direction by the second facing surface.

* * * * *